United States Patent

[11] 3,633,075

| [72] | Inventor | Benjamin K. Hawkins<br>Delta Electric Co., P.O. Box 5097,<br>Greenville, Miss. 38703 |
|---|---|---|
| [21] | Appl. No. | 12,192 |
| [22] | Filed | Feb. 18, 1970 |
| [45] | Patented | Jan. 4, 1972 |

[54] CABINET HOUSING MOTOR CONTROLS MOUNTED ON PLUG-IN MODULES
15 Claims, 18 Drawing Figs.

[52] U.S. Cl. .................................................. 317/114,
317/118, 317/120, 337/196
[51] Int. Cl. ....................................................... H02b 1/04
[50] Field of Search ............................................ 317/101 R,
101 CB, 112, 114, 116, 118, 120; 337/191, 196

[56] References Cited
UNITED STATES PATENTS

| 2,871,457 | 1/1959 | Jencks | 317/101 CB |
|---|---|---|---|
| 3,012,172 | 12/1961 | Kammer | 317/101 CB |
| 3,229,066 | 1/1966 | Rowe | 337/191 X |
| 3,289,048 | 11/1966 | Allegretti | 317/101 CB |

FOREIGN PATENTS

| 345,053 | 4/1960 | Switzerland | 337/196 |
|---|---|---|---|
| 1,220,506 | 10/1963 | Germany | 337/191 |

*Primary Examiner*—Lewis H. Myers
*Assistant Examiner*—Gerald P. Tolin
*Attorneys*—Clarence A. O'Brien and Harvey B. Jacobson ABSTRACT: A compartmentalized cabinet installation for housing motor circuit controls mounted on plug-in modules. Controls such as motor starters and breakers are easily attached to the plug-in modules which allow rapid assembly and disassembly of the controls in associated compartments having power distributing bus bars therein. In order to gain entrance into a compartment, a safety handle must be turned causing actuation of a linked circuit breaker. The cabinet is equipped with a separate trough through which power bus bars pass. Fuses that are easily removed from a power circuit, bridge the bus bars located in the trough and other bus bars supplying power to the plug-in modules.

Benjamin K. Hawkins
INVENTOR.

Benjamin K. Hawkins
INVENTOR.

Benjamin K. Hawkins
INVENTOR.

BY Clarence A. O'Brien
and Harvey B. Jacobson
Attorneys

Benjamin K. Hawkins
INVENTOR.

3,633,075

CABINET HOUSING MOTOR CONTROLS MOUNTED ON PLUG-IN MODULES

During the present time, it is common practice to design a certain size motor control cabinet for housing the circuit breakers and starters for multiple motor units. Generally, the hardware associated with each motor control includes a number of securely fastened members which requires a great expenditure of time when replacement or maintenance of certain circuit controls is required. Also, the assembly and disassembly of such a motor control cabinet is time consuming. Further, when additional controls are added at a future date, present designs are unable to accommodate them efficiently.

The present invention resides in a cabinet installation for motor controls. The cabinet includes a plurality of compartments having plug-in modules which easily become connected with a particular compartment. Each module includes terminals and mounting members for receiving a motor breaker and a motor starter along with the necessary interconnecting leads. Bus bars are provided in the cabinet and have connectors thereon which allow simple parallel connection of additional plug-in modules in respective compartments whenever required. The present invention gives the user a neat and flexible cabinet which allows the addition of motor controls without time-consuming alteration of the cabinet.

Further, the present invention includes fuse holders that are easily connected and disconnected from a bridging connection between power distributing bus bars.

Still further, the present invention includes a safety feature in the form of a handle that normally locks each compartment door. When entrance to the compartment is necessary, the handle is turned thereby causing actuation of a motor circuit breaker.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figures 1, 2:
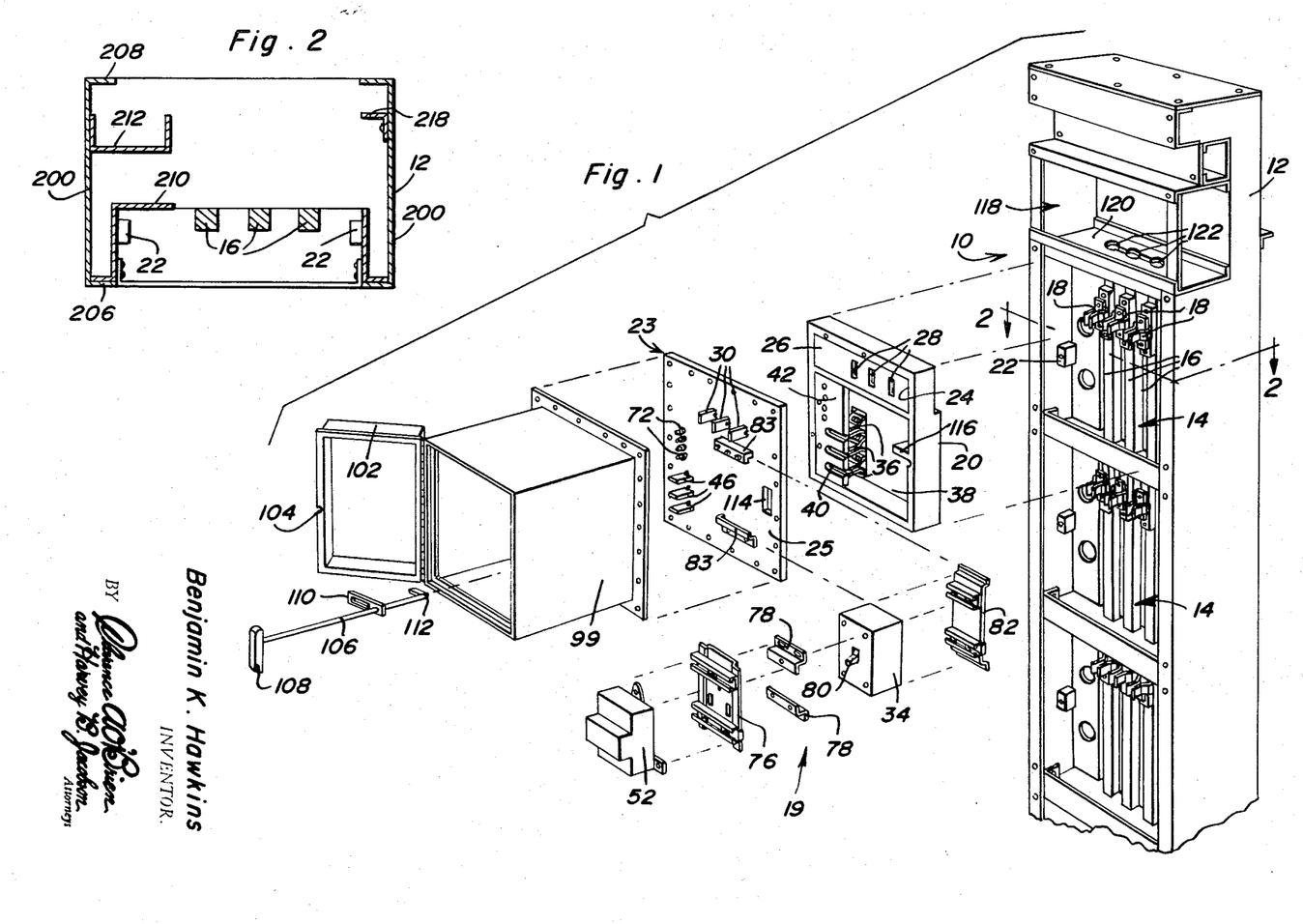
FIG. 1 is an exploded view illustrating the components of a typical motor control cabinet installation.
FIG 2 is a transverse sectional view taken along a plane passing through section line 2—2 of FIG. 1.

Referring to the figures and more particularly FIG. 1 thereof, reference numeral 10 generally indicates a basic motor control installation forming the basis of the present invention. The installation includes a cabinet or housing 12 for enclosing internal hardware. In the cabinet illustrated in FIG. 1, a plurality of vertically spaced compartments 14 enclose a plurality of vertically disposed bus bars 16 which provide power to the motor control components hereinafter discussed. In the illustration shown in FIG. 1, three bus bars are illustrated to conform the installation to a typical three-phase electrical system. However, as will be appreciated, the number of bus bars can be varied with the particular electrical characteristics of the utilized motor system.

Instead of permanently fastening terminals to the bus bars, clip connectors 18 are attached to the bus bars and provide means for connecting the motor controls to the bus bars as hereinafter discussed.

A connector box 20 is positioned against the opening in the top compartment 14 and blocks 22 are mounted within the cabinet to restrain the inward displacement of the connector box 20. This connector box forms a base for a plug-in module 23 which mounts the motor control assembly 19. Considering the structure of connector box 20, an upper compartment 24 is provided having a cover plate 26 thereon with slots 28 formed in the cover plate to allow registry between the slots and the clip connectors 18.

Figure 3:
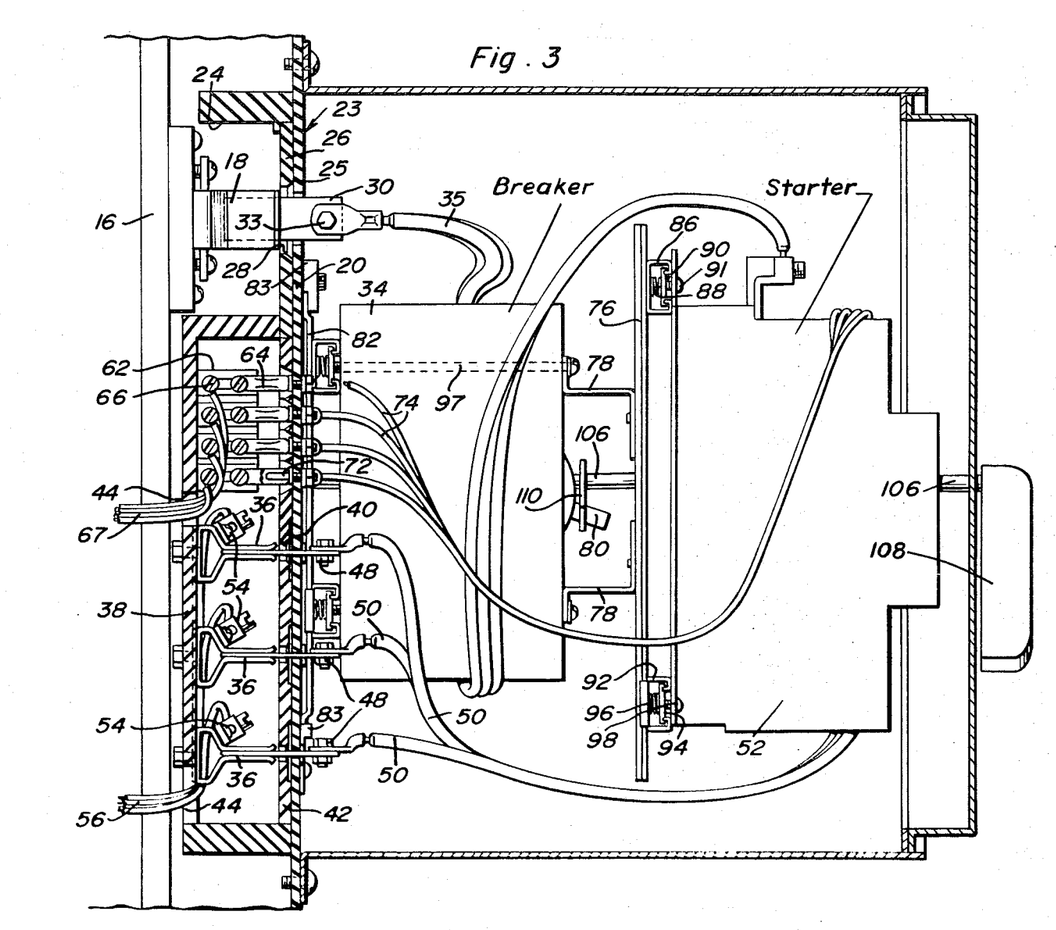
FIG. 3 is a partial sectional view of a single compartment in the cabinet installation illustrating the relative disposition of motor controls and the power connections thereto.

The plug-in module 23 is seen to include a baseplate 25 having peripheral apertures therein for allowing the fastening of the plug-in module to the connector box 20. Three spade connectors 30 pass through the module and are anchored thereto. The rear portions of the spade connectors 30 are received in mating slots 28 formed in connector box 20 and are then finally received in connector clips 18 on the bus bars 16. The forward facing portions of spade connectors 30 are electrically connected with the leads 35 emanating from motor circuit breaker 34 as shown in FIG. 3. This figure further illustrates the connection of terminal lugs 33 to the spade connectors in a conventional fashion.

Figure 7:
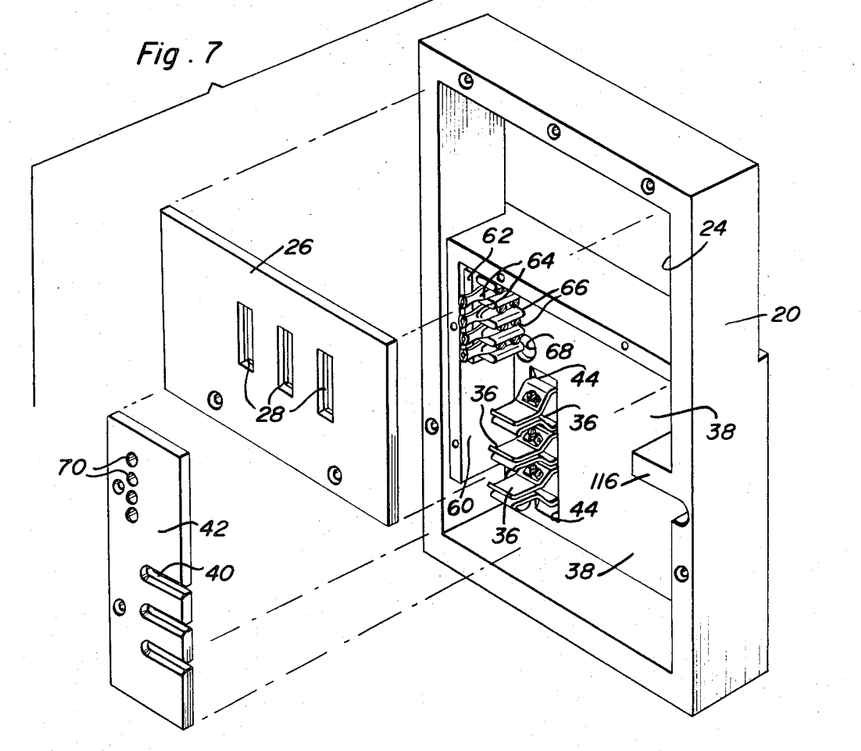
FIG. 7 is an exploded view of a plug-in module mounting base to be utilized with respect to each compartment.

Referring to FIGS. 1 and 7, the connector box is seen to include a rear partition 38 which mounts a second set of three clip connectors 36 adapted to be positioned in rearward registry with slots 40 formed in a vertical panel 42 which is positioned in coextensive perpendicular relation to the aforementioned panel 26. Apertures 44 are formed in the back panel 38 adjacent the clip connectors 36 to allow the passage of power leads therethrough as hereinafter discussed. A second set of spade connectors 46 are seen to pass through the baseplate 25 of plug-in module 23, the spade connectors being fastened to the plate. The rearward portion of the connectors 46 pass through slots 40 in the vertical panel 42 for reception with clip connectors 36. As will be seen in FIG. 3, the forward portion of the spade connectors furnish means for securing terminal lugs 48 thereto, the terminal lugs being the outward connectors for motor starter leads 50 connected at the opposite ends thereof to a conventional motor starter 52.

As indicated in FIG. 3, each of the clip connectors 36 has a binding post 54 connected thereto for allowing the attachment of a lead 56. The combined leads from all clip connectors 36 then pass through the bottom recess 44 and are then connected to suitable motor circuits not forming part of the present invention. Referring to FIG. 7 the connection box 20 will be seen to include a mounting block 60 behind the front panel 42. A terminal strip 62 is mounted on block 60, the strip securing four input jacks 64 thereon. The terminal strip 62 has terminal screws 66 therein which are electrically connected to respective input jacks and provide means for connecting electrical leads 67 (FIG. 3). An aperture 68 is formed in the rear panel 38 of connector box 20 for allowing the passage of the leads 67 therethrough. Vertically aligned apertures 70 are formed in front panel 42 and are adapted to be positioned in registry with the input jacks 64 when the front panel 42 is fastened to the connector box 20. In FIG. 3, plug connectors 72 are seen to be inserted in the input jacks 64, the plugs forming the end connectors for control leads 74 terminating at opposite ends thereof in the conventional motor starter 52. Thus, as clearly shown in FIG. 3, circuit continuity is provided between the control leads 74 and leads 67 which are in turn connected to appropriate motor circuits (not shown).

Referring to FIGS. 1 and 3, the motor circuit breaker 34 and the motor starter 52 are seen to be mounted in horizontal spaced relation and retained in that relation by angle brackets 78 extending between the front face of breaker 34 and a starter mounting bracket 76. The circuit breaker 34 includes a manual cutoff actuator 80. Another mounting bracket 82 secures the rear side of breaker 34 to angle irons 83, the latter being attached to the plug-in module baseplate 25.

Figure 8:
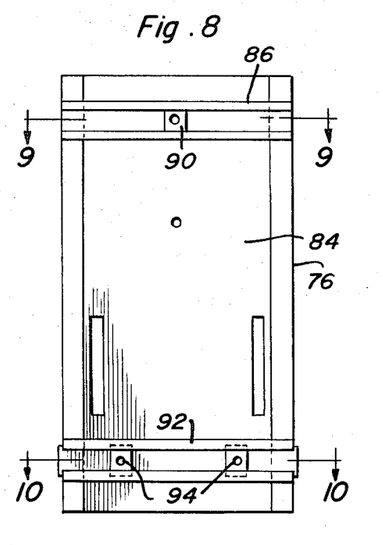
FIG. 8 is a front elevational view of a motor control mounting bracket which becomes attached to the plug-in module.
Figure 9:
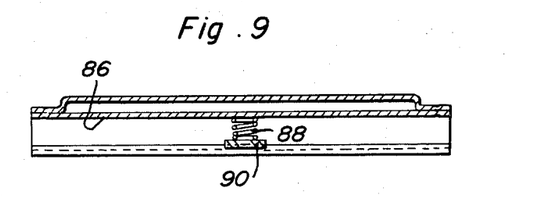
FIG. 9 is a transverse sectional view taken along a plane passing through section line 9—9 in FIG. 8.
Figure 10:
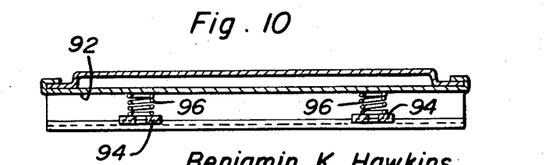
FIG. 10 is a transverse sectional view taken along a plane passing through section line 10—10 of FIG. 8.

The aforementioned brackets 76 and 82 are similar in construction and bracket 76 is clearly shown in FIGS. 8–10. As illustrated, the bracket includes a baseplate 84 having upper and lower parallel spaced tracks 86. FIG. 9 illustrates the disposition of a coil spring 88 in the top track 86 which serves to bias a nut 90 outwardly against the open side of track 86 thereby permitting sliding alignment of the nut in proper position to receive a bolt 91 fastening mounting ears on the starter to bracket 76. Similarly, the track 92 in the bottom of the plate includes two spaced coil springs 96 for biasing nuts 94 outwardly against the track. Bolts 98 secure mounting ears on the lower part of starter 52 to the bracket 76. As will be noted from FIG. 3, the rearwardly disposed mounting bracket 82 which mounts breaker 34 similarly includes coil spring mounted nuts for mounting the breaker 34 to the bracket 82.

Referring to FIG. 1, a hood or cover 99 is seen to extend horizontally outwardly from the plug-in module and is fastened thereto by suitable fasteners. The cover 99 protects the circuit breaker and starter and is normally utilized with a hinge mounted door 102 having a notch 104 for receiving a safety mechanism.

The safety mechanism contemplated by the present invention includes an elongated L-shaped rod 106 passing through slot 104 formed in door 102. The outward end of the rod terminates in a handle which normally resides adjacent the outer surface of the door 102. The intermediate section of the rod is disposed within the space of cover 99 and mounts a slotted latch 110 which is adapted to engage or embrace the actuator 80 of breaker 34. The relative engagement between latch 110 and breaker 34 is more clearly shown in FIG. 3. The inner offset end 112 of rod 106 passes through a rectangular slot 114 in the plug-in module 23 for final disposition behind flange 116 (FIG. 7) which appends inwardly from the peripheral wall of the connector box 20. The offset end 112 prevents unplugging of the module when the breaker is on. In operation of the safety device, handle 108 is rotated until it clears door 102. By so rotating handle 108, latch 110 is rotated to effect switching of the circuit breaker actuator 80. Now when the door 102 is opened, the motor circuitry is cut off thereby enabling servicemen to work with the hardware disposed inwardly of cover 99.

Figure 13:
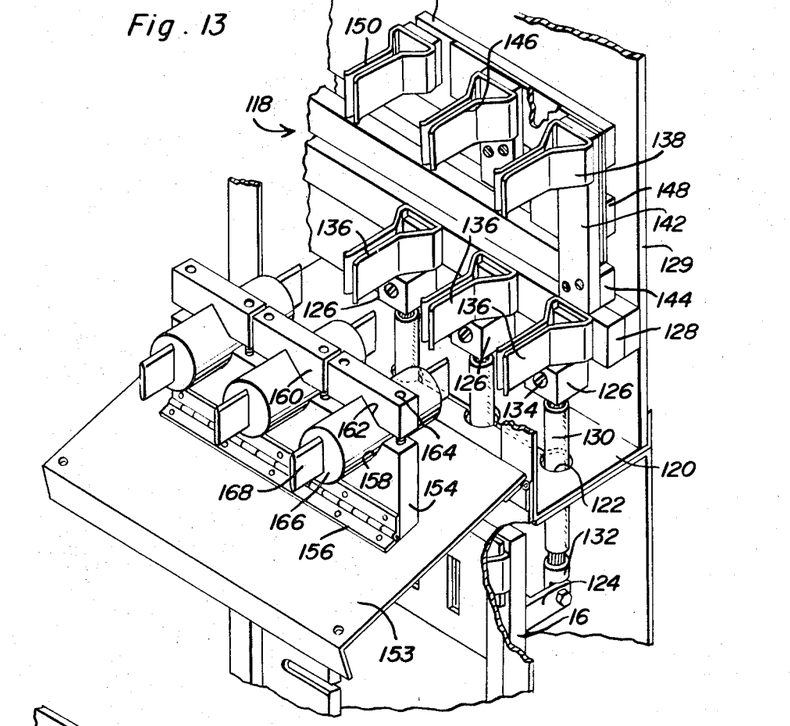
FIG. 13 is a partial perspective view showing a first type of fuse holder assembly utilized in the cabinet of the present invention.

The upper portion of cabinet 12 is seen to include a trough or compartment 118 having a baseplate 120 with apertures 122 formed therein. This compartment is employed to house fuses with associated holders as illustrated in FIG. 13. As will be seen in that figure, each bus bar 16 has a mounting flange 124 attached thereto. A connector block 126 is disposed in parallel aligned relation with each of the flanges 124. A section of locomotive cable or conductor bar 130 is connected between flange 124 and connector block 126. A setscrew 136 in connector block 126 fastens the upper end of the locomotive cable 130. A terminal lug 132 connects the lower end of the locomotive cable to the flange 124. By means of locomotive cable 130 passing through an associated aperture 122 formed in baseplate 120, electrical continuity is established between the vertical bus 16 and fuse holders located within the trough 118.

An insulative backplate 129 is provided at the rear of trough 118 and serves to mount three horizontally disposed and parallel spaced bus bars which are respectively connected to the vertical bus bars 16 through bridging fuses as hereinafter explained. An insulator block 128 mounts three horizontally aligned and spaced terminal clips 136, each associated with a vertical bus bar 16. Viewing FIG. 13, the right contact clip 136 is disposed in vertical spaced relation with respect to an upper terminal clip 138. A conductor bar 142 connects the clip 138 to the lowermost horizontal bus bar 144. Thus, when clips 138 and associated lower clip 136 are shorted by a fuse, circuit continuity is established between the lowermost horizontal bus bar 144 and the rightmost bus bar 16. Similarly, a middle upper clip contact 146 provides circuit continuity between the middle vertical bus bar and the middle horizontal bus bar 148. Clip contact 150 provides continuity between the leftmost bus bar and the upper horizontal bus bar 152.

A hinged door 153 is mounted to the front open face of trough 118 and normally closes the trough. The inside of door 153 mounts a block 154 by means of a piano hinge 156 connected between the block 154 and door 153. Semicylindrical notches 158 are formed in spaced relation along the block's length so that three fuses can be inserted within the notches. Members 160 having V-shaped slots 162 therein are clamped against the fuse by means of bolts 164 extending between the upper members 160 and the lower bolts 154. Thus, the fuse holder mounted on the rear surface of door 153 resembles a pillory. In the preferred embodiment of the present invention, felt strips line the notches in the fuse holder to allow controlled rotation of fuses 166. In the customary form, the fuses include outwardly extending spade lugs 168 adapted to engage associated vertically aligned clip contacts when the door is closed. However, when the door is opened to the position illustrated in FIG. 13, the fuses release their engagement with the contact clips.

Figure 14:
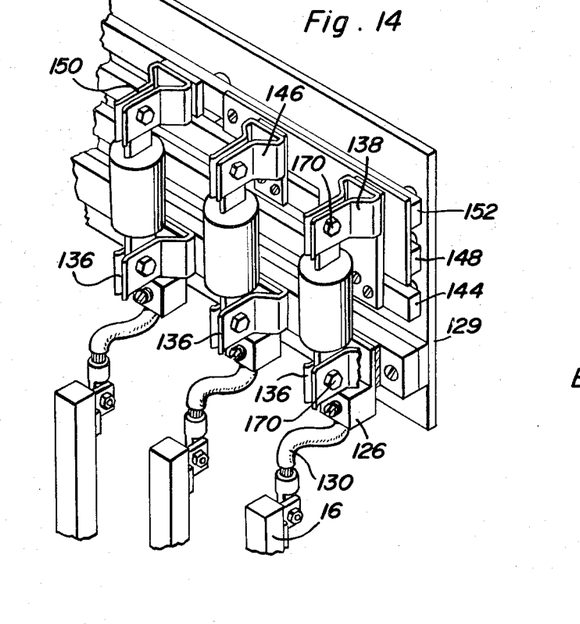
FIG. 14 is a second embodiment of a fuse holder assembly.

In an alternate embodiment shown in FIG. 14, fuses are permanently retained between vertically aligned clip contacts by securing the fuse spade lugs and the engaging clip contacts by clamp screws 170. The embodiment illustrated in FIG. 14 is simplified in that it excludes the fuse holding assembly on the rear door 153 as shown in FIG. 13.

Figure 17:
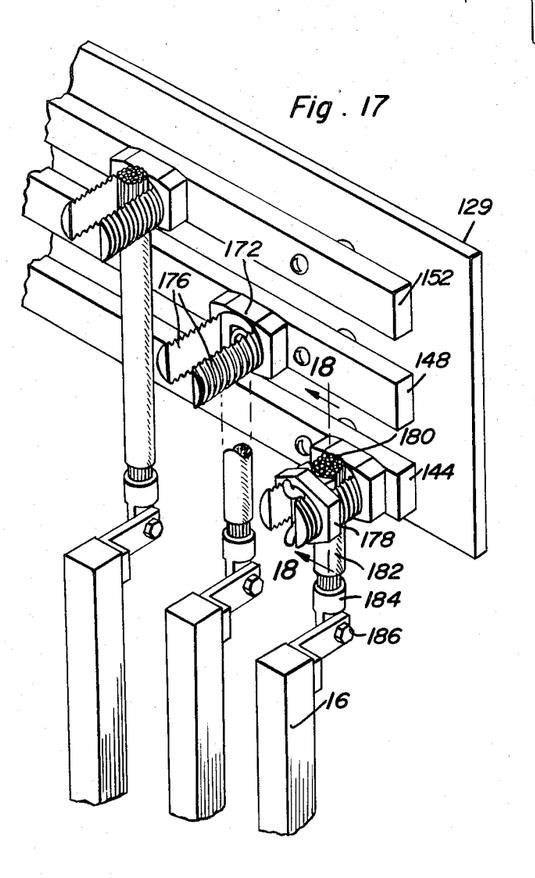
FIG. 17 is a perspective illustrating the connection between horizontal and vertical bus bars which effect direct connection therebetween without fuses.
Figure 18:
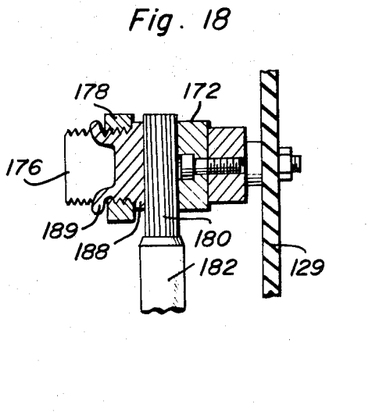
FIG. 18 is a sectional view taken along a plane passing through section line 18—18 in FIG. 17.

A third embodiment for connecting the vertical and horizontal bus bars is illustrated in FIG. 17 which shows structure eliminating fuses entirely. Thus, as illustrated in FIG. 17, each horizontal bus bar includes a nutlike member 172 connected to a respective horizontal bus bar. A split-threaded bolt 176 extends outwardly from the nut member 172 and permits the threaded placement of a nut 178 thereon. However, a space exists between nut 178 and oppositely disposed nut member 172 for receiving a strip portion 180 of conductor cable 182. By tightening the nut 178, the strip portion 180 is clamped in place. The lower end of cable 182 terminates lug 184 which is in turn secured by a fastener 186 to an associated vertical bus bar 16. A jaw member 188 is embraced by nut 178 and includes outwardly bent ears 189 which retains the jaw member in place as the nut 178 is tightened. Tightening of nut 178 causes greater bearing between the jaw member 188 and the strip conductor portion 180.

Figure 15:
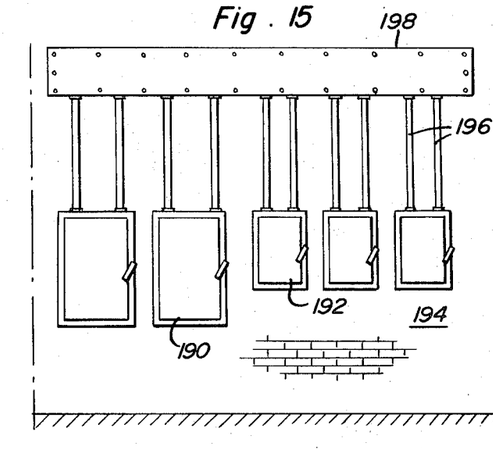
FIG. 15 is a front elevational view of an installation in which individual compartments are mounted to a supporting wall surface in parallel with power bus bars.
Figure 16:
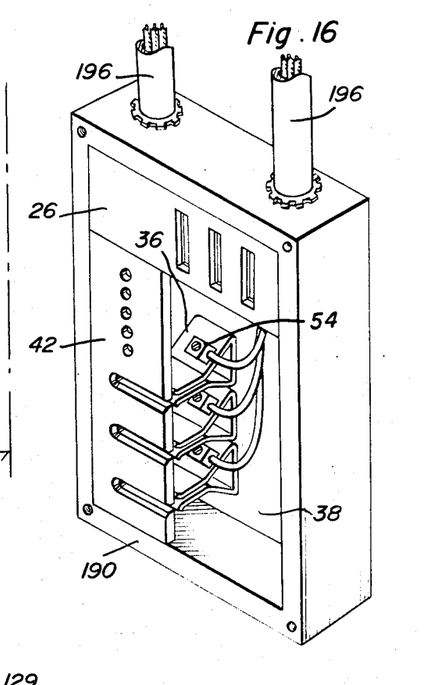
FIG. 16 is a view perspective illustrating the internal components of a single compartment as shown in FIG. 15.

Referring to FIG. 15, a modification is illustrated which includes a plurality of separate compartments, large 190 and small 192, to a supporting vertical wall 194. As will be seen in FIG. 16, each of these compartments comprises a connector box similar to connector box 20 illustrated in FIG. 1. As illustrated in FIG. 15, conduits 196 interconnect the connector box with an elongated horizontal trough which encloses bus bars feeding power to the parallel connected wires in conduits 196. Although the figure illustrates the parallel combination of two wire units, as will be appreciated, this may be altered to accommodate other conventional wire systems such as a three-phase system.

Figure 6:
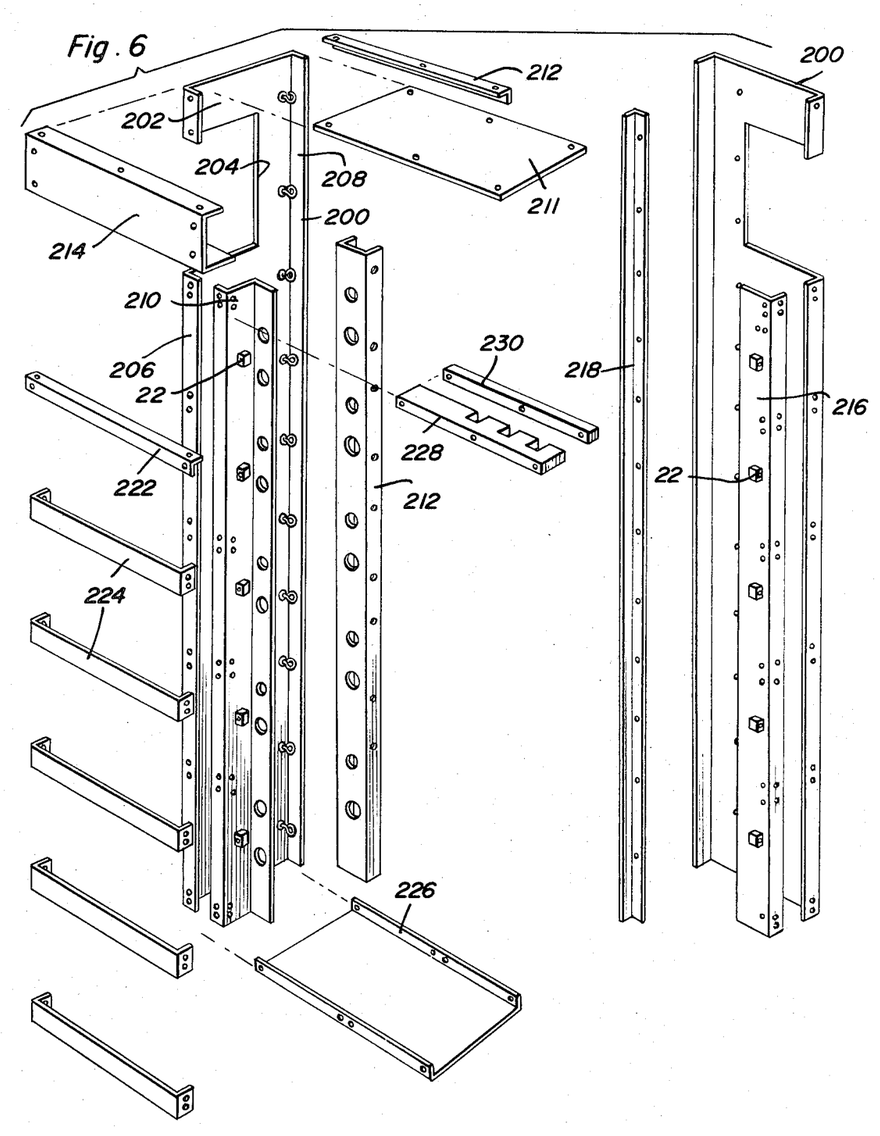
FIG. 6 is an exploded view illustrating the principal parts of the cabinet housing.

FIG. 6 illustrates the basic construction components of the cabinet 12 illustrated in FIG. 1. These components include vertical channels 200 having a base portion 202 which allows the formation of a rectangular slot 204 therein opening outwardly to define the trough 118 on the top of the cabinet. Oppositely disposed parallel offset flanges 206 and 208 define forward and rearward mounting flanges for the vertical channels 200. A Z-shaped vertical angle iron 210 is fastened to the forward flange 206 and serves to mount the mechanical restraining blocks 22 which limit inward displacement of connector box 20 (FIG. 1). The angle iron also includes apertures therein for allowing passage of electrical leads therethrough to the rear of the cabinet. A top plate 211 covers the upper end of the cabinet and is secured thereto by a rear angle iron bracket 212 and a forwardly disposed channel 214. An L-shaped angle iron 216 is vertically disposed against the right end vertical channel 200. A rigidifying strip 218 is suitably fastened to the right-handed channel 200 as seen in FIG. 2. A first horizontally disposed angle iron or strap 222 forms the top edge of the upper cabinet compartment 14 (FIG. 1). Separator straps 224 are interposed between the other vertically adjacent compartments. A bottom plate 226 is connected to the vertical channels 200. A denticulated bracket 228, positioned between vertically adjacent compartments, serves to retain bus bars 16 in aligned and secured relation. A member 230 fits over the notches in the denticulated plate 228 to enclose the bus bars 16 therein.

Figures 4, 5, 11, 12:
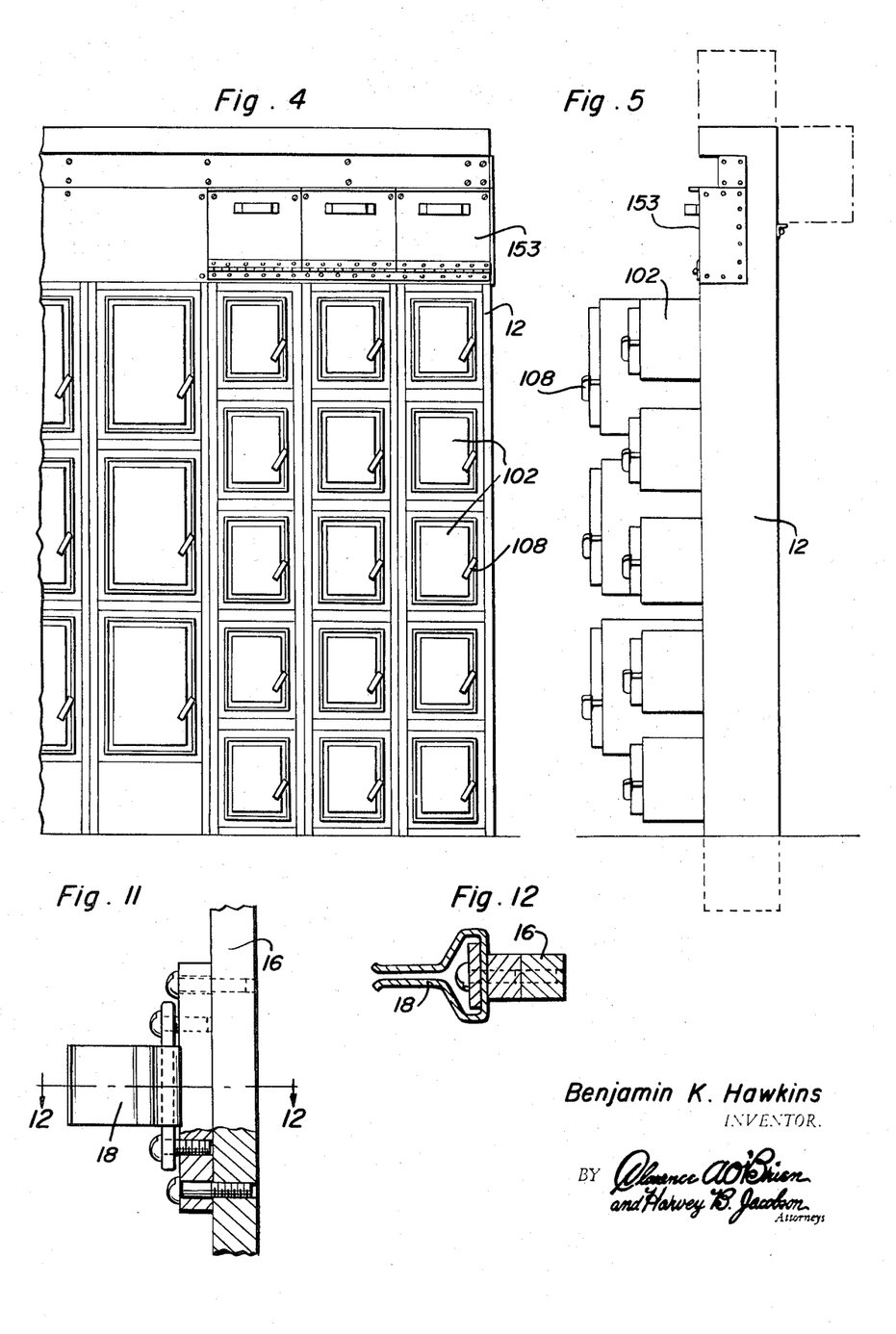
FIG. 4 is a front elevational view showing an expanded cabinet installation.
FIG. 5 is an side elevational view of the cabinet installation shown in FIG. 4.
FIG. 11 is a side elevational view of a clip-in connector utilized to connect each plug-in module with a bus bar.
FIG. 12 is a transverse sectional view taken along a plane passing through section line 12—12 of FIG. 11.

FIGS. 4 and 5 illustrate a composite expanded cabinet including a plurality of compartments both large and small for accommodating the circuit controls of various externally connected motors. As will be appreciated by viewing FIG. 4, the modular concept of the present invention permits the initial installation of a large cabinet with empty compartments and when so required, the compartments can be filled with control hardware for connection to subsequently installed motors.

It should be appreciated that although the aforementioned disclosed preferred embodiment is directed to motor circuit controls, the modular concept of the present invention can be utilized in mounting other types of electrical and electronic components of various sizes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electrical equipment installation comprising a cabinet having at least one compartment with bus bar means disposed therein, a plug-in assembly having a first plurality of contacts therein normally slidably engaging said bus bar means, the assembly including a plug-in module having one side thereof normally facing said bus bar means and an opposite side for mounting control devices thereon, said assembly further including a connector box normally positioned between said plug-in module and said bus bar means and including a first plurality of apertures, said first plurality of contacts being supported by said plug-in module and extending through said apertures to normally slidably engage said bus bar means when said plug-in module abuts said control box, said first plurality of contacts disengaging said bus bar means when said plug-in module is pulled substantially away from said connector box, electrical control means fastened to said opposite side of said plug-in module and having input and output terminals associated therewith, said input terminals being electrically connected to said bus bar means through said first plurality of contacts, a second plurality of contacts supported by said plug-in module and extending from said bus bar side thereof through a second plurality of apertures formed in said connector box, a plurality of output connectors mounted in said bus bar side of said connector box each being aligned with a corresponding one of said second plurality of apertures, said second plurality of contacts normally slidably engaging said output connectors, said output terminals of said control means being electrically connected to said second plurality of contacts, such that both the input and output terminals of said electrical control means may be conveniently disconnected from said bus bar means and said output connectors, respectively, by pulling said plug-in module away from said connector box.

2. The structure set forth in claim 1 wherein said electrical control means includes circuit breaker and motor starter components stacked on top of each other such that one of the components is fastened to the other and is spaced from said opposite side of said plug-in module, thus using a minimum amount of mounting space on that side of the plug-in module.

3. The combination of claim 2 together with a handle mechanism operatively associated with said circuit breaker component for rotation between on and off positions, said handle mechanism including an elongated rod with an offset end portion extending axially therefrom, a slot in said plug-in module, said elongated rod extending through said slot into said connector box, flange means in said connector box for operatively engaging said offset portion when said handle mechanism is in said on position to prevent unplugging of said plug-in module from said connector box, said offset portion disengaging said flange means when said handle mechanism is in said off position.

4. The structure set forth in claim 3 wherein said handle mechanism includes latch means extending from an intermediate section of said elongated rod and operatively engaging an actuator on said circuit breaker component.

5. The structure set forth in clam 3 together with a cover extending from said opposite side of said plug-in module and surrounding said circuit breaker and motor starter components, said cover including a door movable between open and closed positions, said handle mechanism including handle means disposed exteriorly of said cover and adjacent said door to prevent opening of said door when said handle mechanism is in said on position.

6. The structure set forth in claim 5 wherein said handle mechanism includes latch means extending from an intermediate section of said rod and operatively engaging an actuator on said circuit breaker component.

7. The structure set forth in claim 5 wherein said latch means includes a slotted plate extending axially from said elongated rod with a slot embracing said circuit breaker actuator.

8. The structure set forth in claim 7 wherein said starter component is mounted onto said circuit breaker component with the circuit breaker actuator therebetween, and bracket means spacing said circuit breaker actuator from said starter component for unimpeded movement between said on and off positions.

9. The structure set forth in claim 1 wherein said control box includes a plurality of plug-in jacks and a third plurality of apertures aligned with said plug-in jacks, and a plurality of starter control leads extending through said third plurality of apertures and normally slidably engaging said plug-in jacks.

10. An electrical control installation comprising a cabinet having at least one compartment therein, bus bar means disposed in said compartment, a plug-in assembly comprising a plug-in module having a plurality of line contacts therein normally slidably engaging said bus bar means and a plurality of load contacts normally connected to an electrical load, said plug-in module including a relatively flat panel having one side facing said cabinet and bus bar means and an opposite side facing away from said cabinet and bus bar means, said line contacts being supported by said panel and extending from said one side of said panel, said plug-in module being movable from the normal contact connection position to a disconnected position wherein said line and load contacts are disconnected from said bus bar means and the electrical load respectively, first bracket means fastened to said opposite side of said panel, a pair of control components supported by said bracket means, said components being horizontally spaced from each other in a direction substantially perpendicular to said opposite panel side, one of said pair of components fastened directly to said first bracket means, and second bracket means connected to said one component to support the other of said pair of components and to horizontally space the components from each other, each of said pair of components being electrically connected to said line and load contacts respectively.

11. The structure set forth in claim 10 wherein said panel is generally rectangular in shape, said line and load contacts extending through said panel between said one side and said opposite side and adjacent said pair of components, the overall size of said panel being kept to a minimum by stacking said components on top of each other.

12. The structure set forth in claim 10 wherein one of said components is a circuit breaker with manual actuator and the other of said components is a motor starter.

13. The combination set forth in claim 12 together with a handle mechanism operatively associated with said circuit breaker actuator, said handle mechanism being rotatable between open and closed positions and including latch means operatively engaging said circuit breaker actuator for movement thereof when said handle mechanism is rotated between said open and closed positions.

14. The structure set forth in claim 13 wherein said handle mechanism includes locking means for preventing unplugging said plug-in module from the connected position when said handle mechanism is in said closed position and permitting such unplugging when said handle mechanism is in said open position.

15. The structure set forth in claim 14 wherein said latch means extends between said starter and said circuit breaker into the space provided by said second bracket means.

* * * * *